United States Patent [19]

Shinyagaito et al.

[11] Patent Number: 5,886,753

[45] Date of Patent: Mar. 23, 1999

[54] METHOD OF CONTROLLING REMOTE CONTROL ELECTRONIC APPARATUS COUPLED TO A NETWORK AND A REMOTE CONTROL ELECTRONIC APPARATUS TO BE COUPLED TO A NETWORK

[75] Inventors: Tatsuya Shinyagaito; Masanori Kono, both of Yokohama, Japan

[73] Assignee: Victor Company of Japan, Ltd., Yokohama, Japan

[21] Appl. No.: 807,702

[22] Filed: Feb. 28, 1997

[30] Foreign Application Priority Data

Feb. 29, 1996 [JP] Japan .................................. 8-069439

[51] Int. Cl.$^6$ .................................................. H04N 5/44
[52] U.S. Cl. .......................... 348/734; 455/352; 348/114; 348/211
[58] Field of Search ............................... 348/9, 7, 4, 734, 348/565, 211, 743, 570; 211/26.1; 360/60; 455/352

[56] References Cited

U.S. PATENT DOCUMENTS

| | | | |
|---|---|---|---|
| 4,227,259 | 10/1980 | Mogi ........................................ | 455/352 |
| 4,270,145 | 5/1981 | Farina ...................................... | 348/570 |
| 4,331,974 | 5/1982 | Cogswell et al. ........................... | 348/9 |
| 4,586,077 | 4/1986 | Wonn et al. ................................ | 348/7 |
| 5,042,670 | 8/1991 | Timberlake ............................. | 211/26.1 |
| 5,055,924 | 10/1991 | Skutta ......................................... | 348/4 |
| 5,068,734 | 11/1991 | Beery ....................................... | 348/570 |
| 5,191,488 | 3/1993 | Hashimoto ................................. | 360/60 |
| 5,386,251 | 1/1995 | Movshovich ............................. | 348/734 |
| 5,471,253 | 11/1995 | Nguyen .................................... | 348/743 |
| 5,502,504 | 3/1996 | Marshall et al. .......................... | 348/565 |
| 5,589,878 | 12/1996 | Cortjens et al. .......................... | 348/211 |

Primary Examiner—Parshotam S. Lall
Assistant Examiner—Ban Le
Attorney, Agent, or Firm—Pollock, Vande Sande & Amernick

[57] ABSTRACT

A method of controlling remote control electronic apparatus coupled to a network and a remote control electronic apparatus to be coupled to a network are disclosed. Each remote control electronic apparatus has a CPU and a ROM including a local control program expressed by an independent language which is interpretable by the CPU, a remote control program expressed by a virtual language, a virtual language processing program for processing the virtual language to make it interpretable by the CPU. When one remote control electronic apparatus is required to control another remote control electronic apparatus coupled to the network, the remote control electronic apparatus requests to transmit the remote control program of another remote control apparatus. The remote control electronic apparatus receiving the transmitted remote control program of another remote control apparatus generates an operation command signal using the received remote control program through the virtual language processing program and transmits the operation command signal to another remote control apparatus which is actually operated by the local control program existing in another remote control apparatus according to the operation command signal.

2 Claims, 9 Drawing Sheets

METHOD OF CONTROLLING REMOTE CONTROL ELECTRONIC APPARATUS COUPLED TO A NETWORK AND A REMOTE CONTROL ELECTRONIC APPARATUS TO BE COUPLED TO A NETWORK

BACKGROUND OF THE INVENTION

1. Field of the Invention

This invention relates to a method of controlling remote control electronic apparatus coupled to a network and to a remote control electronic apparatus to be coupled to a network.

2. Description of the Prior Art

A method of controlling remote control electronic apparatus coupled to a network is known. For example, the AV (Audio Visual) compu-link system including television sets and video tape recorders or the like are coupled through a communication cable is known. In this system, command codes for power on and off, changing the channel, reproducing, recording, changing a volume, or the like are uniquely assigned in advance among remote control electronic apparatus connected to the communication cable.

The remote controlling is provided by transmitting the command code from one apparatus to another through the communication line.

SUMMARY OF THE INVENTION

The aim of the present invention is to provide an improved method of controlling remote control electronic apparatus coupled to a network and to an improved remote control electronic apparatus to be coupled to a network.

According to the present invention, a method of controlling a plurality of electronic apparatus coupled to a network is provided, each electronic apparatus having a microprocessor, a display, at least a memory, a remote control unit communication unit, and a functional unit effecting a plurality of functions, the method comprising the steps of:

providing a local control program, a remote control program, and a virtual language processing program in at least a memory of each electronic apparatus, the local control program of each electronic apparatus being provided to be executed by the microprocessor to control each electronic apparatus in response to an input operation signal from a remote control unit in cooperation with the remote control program through the remote control unit communication unit when the input operation signal is indicative of controlling the functional unit of each electronic apparatus itself and to request another electronic apparatus to transmit the remote control program of another electric apparatus through the network and receive the remote control program of another electronic apparatus when the input operation signal is indicative of controlling the functional unit of another electronic apparatus, each local control program being expressed by each language interpretable by the microprocessor of each electronic apparatus, the remote control program of each electronic apparatus being provided to display an operation inputting interface image for selecting one of the plurality of functions of each electronic apparatus in cooperation with the local control program of each electronic apparatus, receive the input operation signal indicative of selecting one of the plurality of functions from the remote control unit, and control the functional unit of each electronic apparatus together with the local control program of each electronic apparatus in accordance with the input operation signal indicative of selecting one of functions, the remote control program including command and data which are expressed by a virtual language and being executed by the microprocessor through processing by the virtual language processing program, the virtual language being common in the network; and when the microprocessor of one of the electronic apparatus receives the input operation signal indicative of a request for controlling another electronic apparatus from the remote control unit, executing the local control program of one of electronic apparatus to request another electronic apparatus to transmit the remote control program of another electronic apparatus, receiving and storing the remote control program of another electronic apparatus in at least a memory and executing the remote control program from another electronic apparatus in the memory, displaying the operation inputting interface image on the display of one of the electric apparatus, receiving and transmitting the input operation signal indicative of selecting one of functions of another electronic apparatus from the remote control unit to the local control program of another electronic apparatus through the network to effect one of the functions of another electronic apparatus.

According to the present invention, an electronic apparatus to be coupled to another electronic apparatus through a network is provided which comprises:

a microprocessor, a display, a RAM, a ROM, a remote control unit communication unit, a network interface unit, and a functional unit for effecting a plurality of functions, wherein the ROM stores a local control program independently interpretable for the microprocessor, a remote control program including operation input interface image data for selecting one of the plurality of functions, and a virtual language processing program for interpreting the remote control program for the microprocessor, the microprocessor receives an input operation signal from a remote control unit via the remote control unit communication unit in cooperation with the local control program and remote control program, when the microprocessor receives the input operation signal indicative of a request for controlling another electronic apparatus from the remote control unit, in cooperation with the local control program of the electronic apparatus, the microprocessor requests another electronic apparatus to transmit the remote control program of another electronic apparatus through the network, receives and stores the remote control program of another electronic apparatus in the RAM, the microprocessor executes the remote control program from another electronic apparatus in the RAM using the virtual language processing program, displays the operation inputting interface image data of another electronic apparatus on the display, and receives and transmits the input operation signal indicative of selecting one of plurality of functions of another electronic apparatus from the remote control unit to another electronic apparatus through the network and the network interface unit to effect one of the functions of another electronic apparatus through the local control program in another electronic apparatus.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Figure 1:
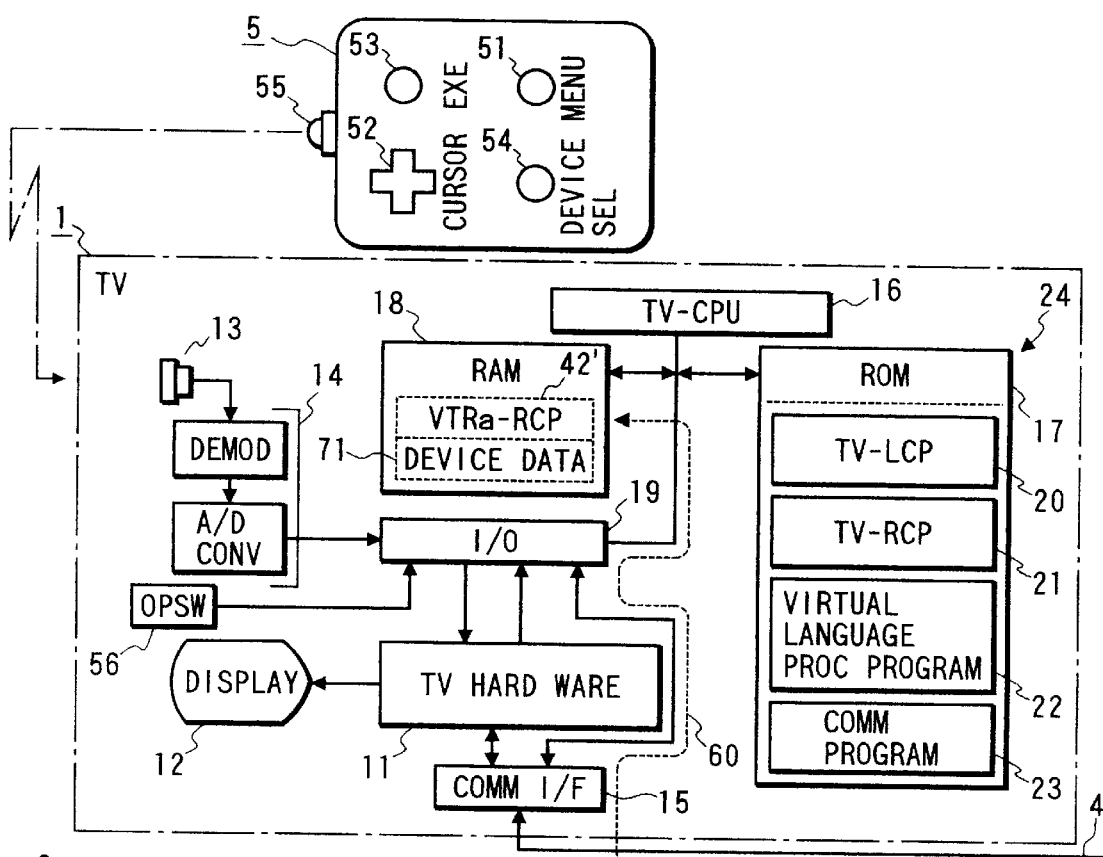
FIG. 1 is a block diagram of an embodiment of the present invention showing a plurality of remote control electronic apparatus coupled to a network.
Figure 1:
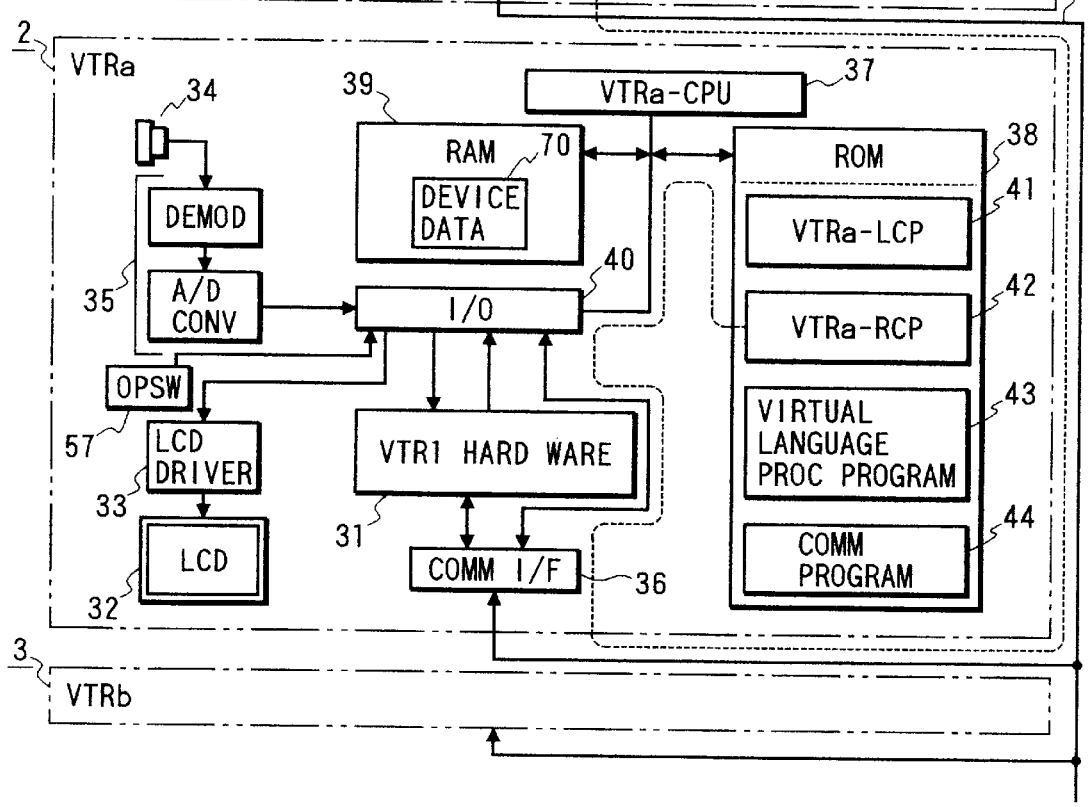

FIG. 1 is a block diagram of an embodiment of the present invention showing a plurality of remote control electronic apparatus coupled to a network and an operation panel of a remote control unit is also shown.

A television set (TV) 1, a video tape recorder (VTRa) 2, and a video tape recorder (VTRb) 3 are coupled to a communication cable 4. A remote control unit 5 is coupled to the television set 1 by an infrared signal ray, which can be coupled to the video tape recorder 2 or the video tape recorder 3 also.

The television set 1 comprises a television hardware portion 11, a display (crt) 12, a light receiving portion 13 for receiving modulated infrared signal ray indicative of either of operations of respective keys on the operation panel from the remote control unit 5, a demodulation and a/d converting portion 14 for demodulating and a/d-converting the received infrared signal, a communication interface 15, having a video channel and a data channel, for interfacing the television set 1 with the communication cable 4, and a control circuit 24 including a central processing unit (TV-CPU) 16, a ROM (read-only memory) 17, and a RAM (random access memory) 18, and an I/O (input and output) port 19.

The ROM 17 stores a local control program (TV-LCP) 20 for the television set 1, a remote control program (TV-RCP) 21 for the television set 1, a virtual language processing program 22, and a communication program 23.

The video tape recorder (VTRa) 2 comprises a VTR hardware portion 31 for effecting a plurality of functions such as, recording, reproducing, fast forwarding, and rewinding operations, etc., a liquid crystal display (LCD) 32, a liquid crystal display driver 33 for driving the LCD 32, a light receiving portion 34 for receiving modulated infrared signal ray indicative of either of operations of respective keys on the operation panel from the remote control unit 5, a demodulation and a/d converting portion 35 for demodulating and a/d-converting the received infrared signal, a communication interface 36, having a video channel and a data channel, for interfacing the video tape recorder 2 with the communication cable 4, and a control circuit including a central processing unit (VTRa-CPU) 37, a ROM 38, and a RAM 39, and an I/O (input and output) port 40.

The ROM 38 stores a local control program (VTRa-LCP) 41 for the video tape recorder 1, a remote control program (VTRa-RCP) for the video tape recorder 2, a virtual language processing program 43, and a communication program 44.

FIG. 1 shows only the television set 1, the video tape recorders 2 and 3. However, it is possible to couple other remote control electronic apparatus having the similar circuit structure other than the inherent unit to remote control electronic apparatus, that is, the television hardware 11, the video tape recorder hardware portion.

Moreover, the remote control unit 5, which is different from the conventional type remote control units of television sets or video tape recorders, has a menu key 51, a cross shape cursor key 52, an execution key 53, and a device selection key 54 arranged as shown in FIG. 1. This remote control unit 5 can control any of the televisions set TV1, and the video tape recorders VTRa 2 and VTRb3. However, the light receiving portion 13 and the light transmitting portion 55 have directivities, so that each of the television set 1 and the video tape recorders 2 and 3 can be selectively operated. Further, the remote control unit 5 may have a device selecting function to selectively control the television set 1 and video tape recorders 2 and 3, so that though these devices are adjacently located, they can be controlled selectively.

Respective programs stored in the ROM 17 of the television set 1 and the ROM 38 of the video tape recorder 2 will be described, wherein there may be no distinguishing between the program of the television set and of the video tape recorder because there are common programs and it is important to control either of the remote control electronic apparatus itself or another remote control electronic apparatus.

(1) Local Control Programs (TV-LCP 20, VTRa-LCP41)

The local control programs of the television set 1 and the video tape recorder 2 are for controlling their own hardware portions (television hardware 11 and the video tape recorder hardware 31).

More specifically, each of the local control programs includes a program ① for controlling the hardware of its own remote control electronic apparatus in response to an operation input of either of operation switches 56 provided to the operation panel on an enclosure of the remote control electronic apparatus, a program ② for controlling the hardware portion of its own remote control electronic apparatus in response to an operation from its remote control unit 5 together with its remote control program through the input interface image, and a program ③ for, when there is a request for controlling the hardware portion of another remote control electronic apparatus from the remote control unit 5, loading the remote control program of another remote control electronic apparatus into the RAM of its own remote control electronic apparatus and providing a communication between the loaded remote control program and the local control program of another apparatus using the input interface image to control another remote control electronic apparatus through the network 4.

This local control program is expressed by a language which can be directly executed by the its own central processing unit. Therefore, if the kinds of central processing units are different each other, the kinds of languages are different.

(2) Remote Control Programs (TV-RCP21, VTRa-RCP42)

Figure 2B:
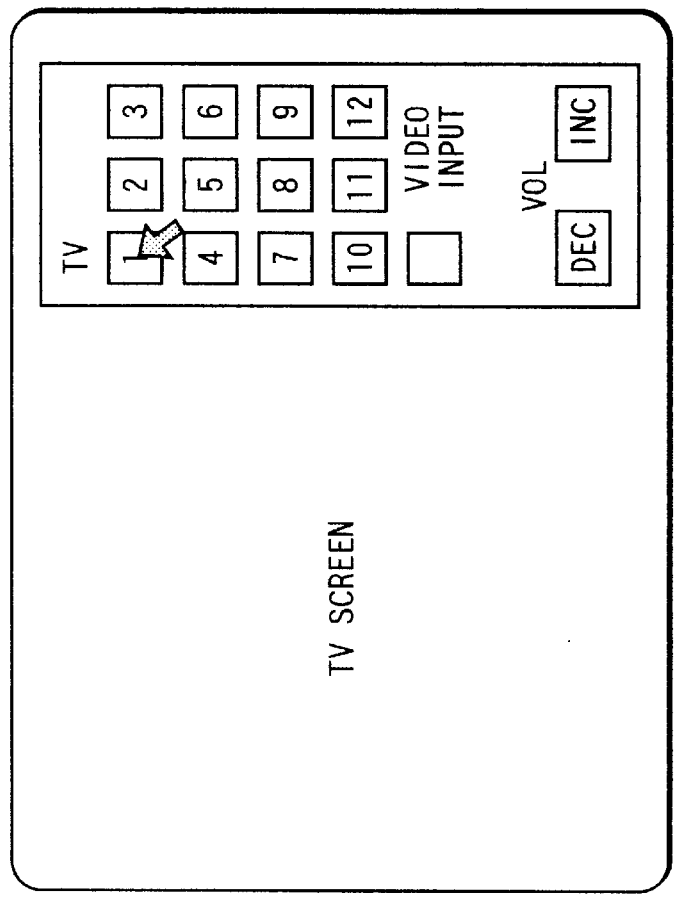
FIG. 2B is an illustration of this embodiment showing an operation input interface image on the display of a television set.
Figure 2A:
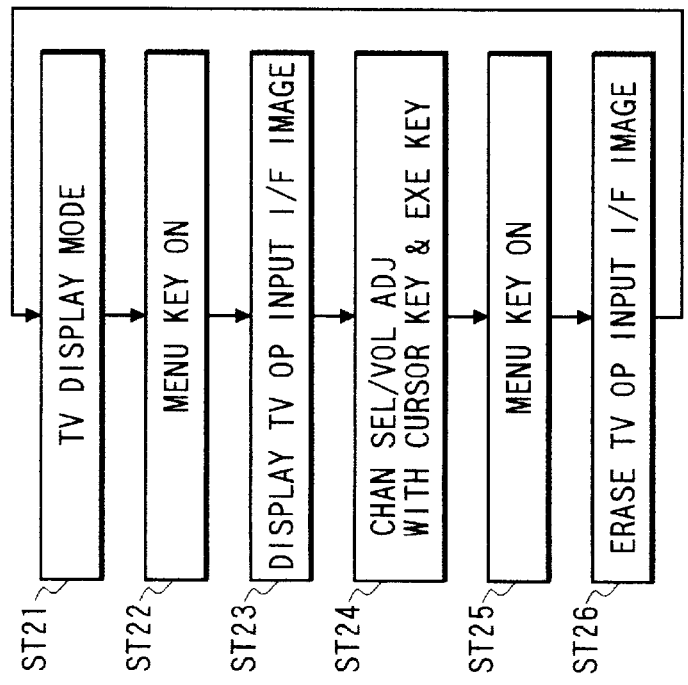
FIG. 2A depicts a flow chart of this embodiment showing a television control operation with a guide by an operation input interface image on a display.

The remote control program includes data of the operation input interface image of its own remote control electronic apparatus. FIG. 2A depicts a flow chart of this embodiment showing a television control operation with a guide by the operation input image on the display. FIG. 2B is an illustration of this embodiment showing the operation input image on the display of the television set 1. The remote control program includes data of the operation input image for selecting one of functions effected by its hardware portion. The remote control program controls the hardware portion of its own remote control electronic apparatus together with the local control program of its own remote control electronic apparatus through the remote control unit input operation using the operation input interface image as shown in FIGS. 2A and 2B, and when the remote control program is loaded in another remote control electronic apparatus, it displays the operation input interface image for selecting its own functions on the display of another remote control electronic apparatus and executes controlling the hardware portion of its own remote control electronic apparatus through the communication together with the local control program of its own remote control electronic apparatus.

This program is expressed by a virtual language which commonly defined within the network to operate a virtual central processing unit. Therefore, the central processing units of respective remote control electronic apparatus cannot execute this directly, so that the remote control program is executed by each central processing unit through interpreting by the virtual language processing program.

(3) Virtual Language Processing Programs 22, 43

The virtual language processing program is for translating the remote control program expressed by the virtual language into a language which can be executed by the central processing unit of its own remote control electronic apparatus. More specifically, it has a translater for converting the remote control program expressed by the virtual language into native codes of the central processing unit of its own remote control electronic apparatus or an interpreter for translating commands in the remote control program word by word.

(4) The Communication Programs 23 and 44

The communication program is for controlling the communication with another remote control electronic apparatus through the communication interface and the communication cable 4.

The communication program does not control the content of the communication data but only controls the address of its own remote control electronic apparatus and an address of the destination remote control electronic apparatus during the communication.

Then, operations will be described in the case the television 1 is controlled by the remote control unit 5 and then, the case that the video tape recorder 2 is controlled via the television 1. It is assumed that all units of this system have been turned on and the system has been operated.

More specifically, when the system is started up, the operator inputs address data and data of kinds of remote control electronic apparatus coupled to the communication cable 4 to the television set 1 through the remote control program 20 and the remote control program 21 using the remote control unit 5. The central processing unit 16 stores the address data and data of kinds of remote control electronic apparatus, as device data 71, in the RAM 18 through the remote control program 20 and the remote control program 21 using the remote control unit 5. The communication program 23 transmits the address data and data of kind of remote control electronic apparatus coupled to the communication cable 4. Other remote control electronic apparatus receive the address data and data of kind of remote control electronic apparatus and store the data.

When the television 1 is in a display mode in step st21, the central processing unit 16 is executing the local control program 20. In this condition, when an operator operates the menu key 51 on the remote control unit 5 with the light emitting portion 55 directing to the light receiving portion 13 in step st22, the central processing unit 16 of the television set 1 accesses to the remote control program 21 under the control of the local control program 20 and displays the operation input interface image which represents a graphical image of a control panel as shown in FIG. 2B on the display 12 through the translation by the virtual language processing portion in step st23.

Then, the operator shifts the cursor (pointer) to one of areas indicative of a channel number or a decrease or an increase of the sound volume on the operation input interface image and then, turns on the execution key to select the desired channel or an adjustment of the sound volume in step st24. Then, the operator depresses the menu key 51 to erase the operation input interface image on the display 12 in step st25.

During this operation, the operation input from the remote control unit 5 is received by the central processing unit 16 of the television set 1 under the control of the local control program 20 of the television set 1 and in response to each operation input, the central processing unit 16 controls the television hardware portion 11 with translating the remote control program 21 by the virtual language processing program 22.

Figure 3B:
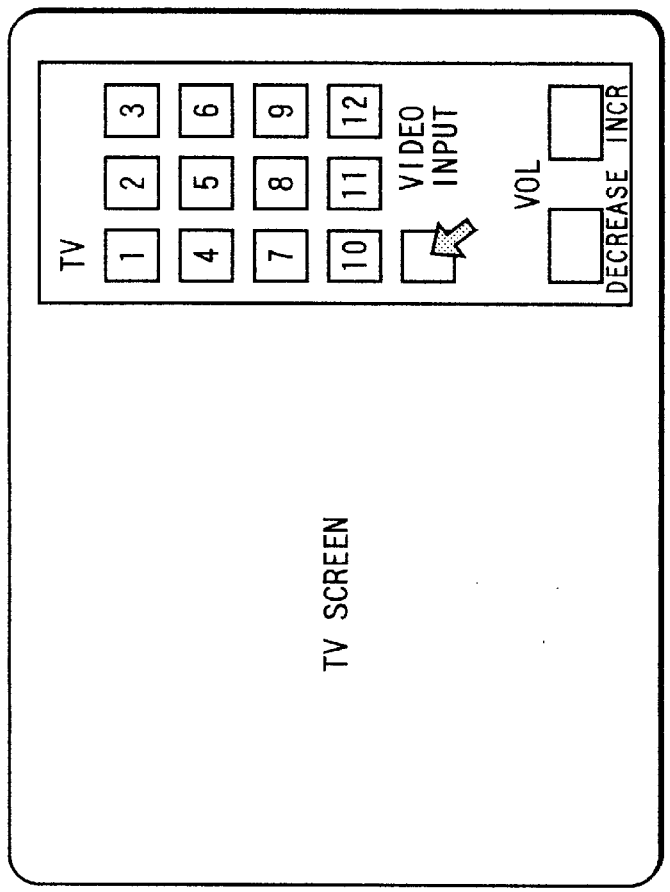
FIG. 3B is an illustration of this embodiment showing an operation input interface image on the display.
Figure 3A:
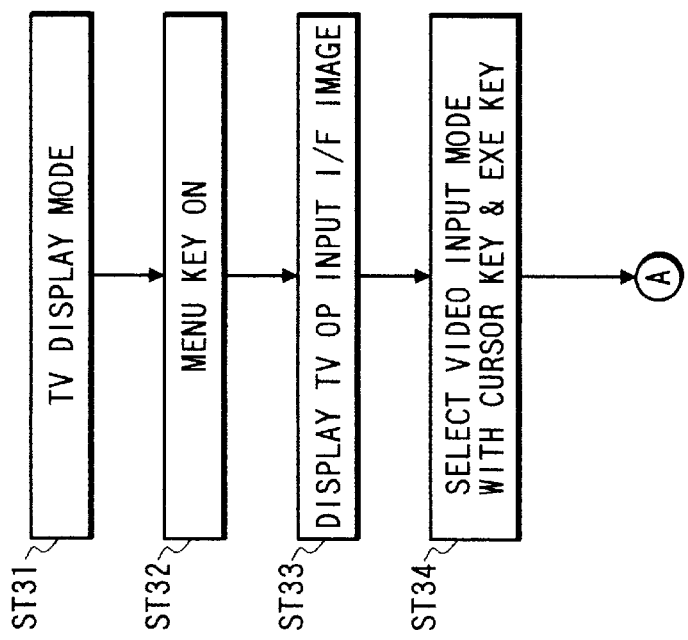
FIG. 3A depicts a flow chart of this embodiment showing a video input selection operation.

If the operator desires to watch a program from the video tape recorder 2, the operator can select a video input mode. FIG. 3A depicts a flow chart of this embodiment showing the video input selection. FIG. 3B is an illustration of this embodiment showing the operation input image on the display 12 in the condition of step st34 shown in FIG. 3A. The operator displays the operation input image by depressing the menu key 51 in steps st32 and st33, shifts the cursor to a display area of VIDEO INPUT and then, depresses the execution key 53 in step st34 with directing the light emitting portion 55 to the light receiving portion 13 of the television set 1.

Figure 4B:
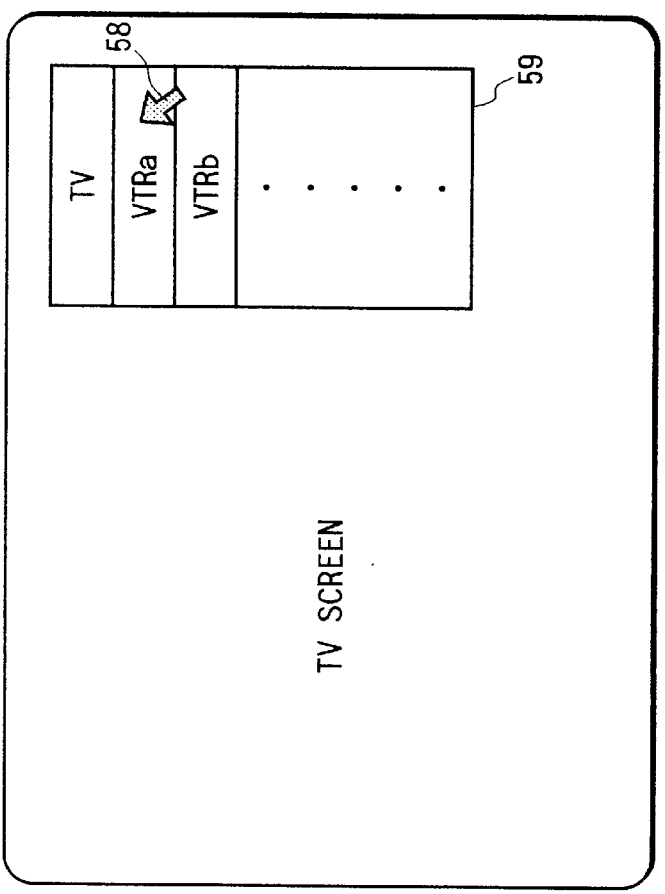
FIG. 4B is an illustration of this embodiment showing an operation input interface image for selecting one of devices.
Figure 4A:
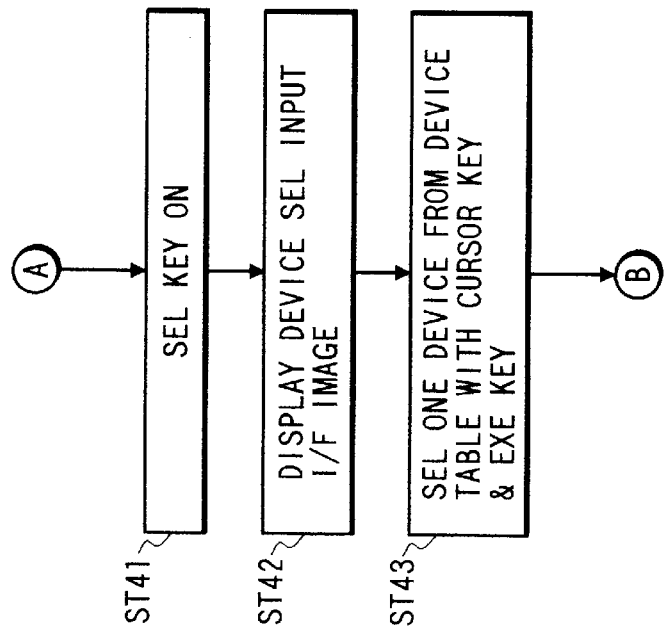
FIG. 4A depicts a flow chart of this embodiment showing a device selection input operation.

Then, the central processing unit 16 changes the mode from the television display mode to the video input mode. FIG. 4A depicts a flow chart of this embodiment showing the device (remote control electronic apparatus) selection input and FIG. 4B is an illustration of this embodiment showing the operation input image for selecting one of devices (units).

When the operator depresses the device selection key 54 of the remote control unit 5 in step st41, the central processing unit 16 of the television set 1 receives this command and displays the operation input image for selecting one of devices in step st42 in accordance with data of kinds of remote control electronic apparatus coupled to the communication cable 4. The data of kinds of remote control electronic apparatus provides the device table 59. The operator shifts the cursor 58 to the display area of the desired device as shown in FIG. 4B and depresses the execution key 53 in step st43, the central processing unit 16 enters a condition that it controls another remote control electronic apparatus. However, if the operator selects the television set 1 from the selection menu shown in FIG. 4B, the operation input interface image returns to the image shown in FIG. 2B.

Figure 5B:
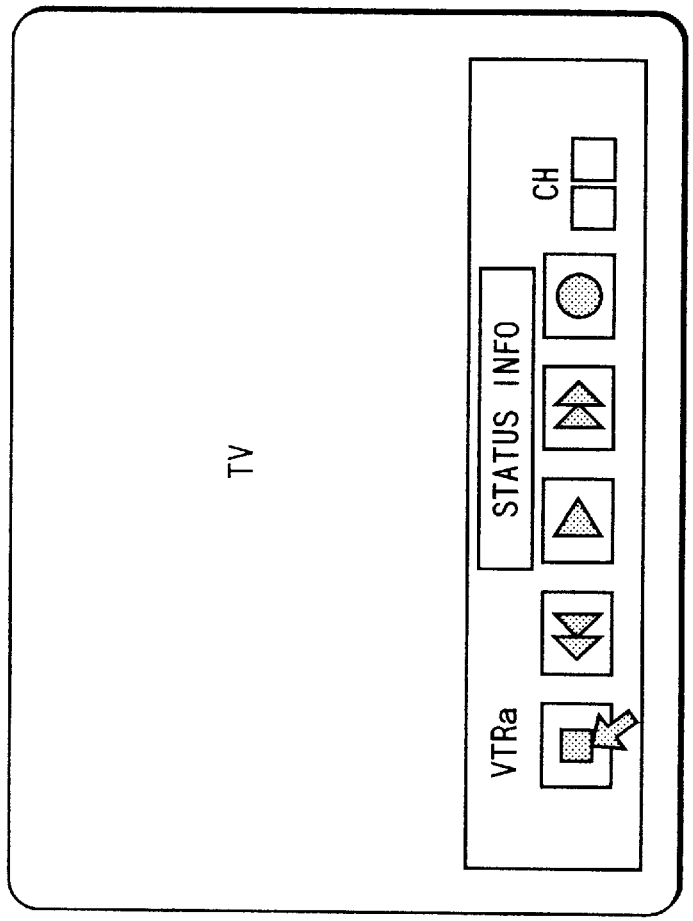
FIG. 5B shows an illustration of this embodiment showing an operation input interface image for controlling a video tape recorder.
Figure 5A:
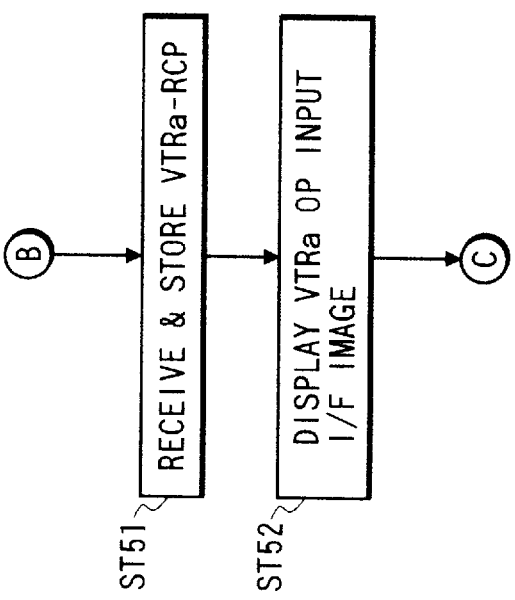
FIG. 5A depicts of a flow chart of this embodiment showing an operation controlling another electronic apparatus.

FIG. 5A depicts of a flow chart of this embodiment showing the operation controlling another remote control electronic apparatus and FIG. 5B shows an illustration of this embodiment showing the operation input interface image for controlling the video tape recorder 2.

As mentioned, when the operator selects the video tape recorder 2, the central processing unit 16 reads a control request command for the video tape recorder 2 from the local control program 20 of the television set 1 in accordance with the address data and data of kind of the remote control electronic apparatus stored in the RAM 18 and executes the communication program 23 to control the communication interface 15 to transmits the control request command to the video tape recorder 2 through the communication cable 4.

The central processing unit 37 of the video tape recorder 2 receiving the control request command, reads the remote control program 42 from the ROM 38, executes the communication program 44, and transmits the read remote control program 42 to the television set 1 through the communication interface 36 and the communication cable 4 under the control of the local control program 41 as shown by the chain line 60 in FIG. 1.

The central processing unit 16 of the television set 1 receives the remote control program 42 transmitted from the video tape recorder through the interface 15 and stores the remote control program 42 in the RAM 18 under the control of the local control program 20 in step st51.

Then, the central processing unit 16 executes the remote control program stored in the RAM 18 with commands and data in the remote control program 42' translated by the virtual language processing program under the control of the local control program 20.

That is, because the remote control program is expressed by the virtual language, the central processing unit 16 cannot execute the remote control program 42 directly, so that the central processing unit 16 translates the commands and data of the remote control program 42 by the virtual language processing program 22 and executes the translated commands.

The central processing unit 16 displays the operation input interface image data as shown in FIG. 5B in step st52 under the control of the local control program 20. Then, the central processing unit 16 receives an operation input from the remote control unit 5.

The operation input interface image of the video tape recorder 2 includes icons representing operations of reproduction, stopping, fast-forwarding, rewinding, and icons for controlling the television set 1 and also provides the status information to the operator as shown in FIG. 5B.

Figure 6B:
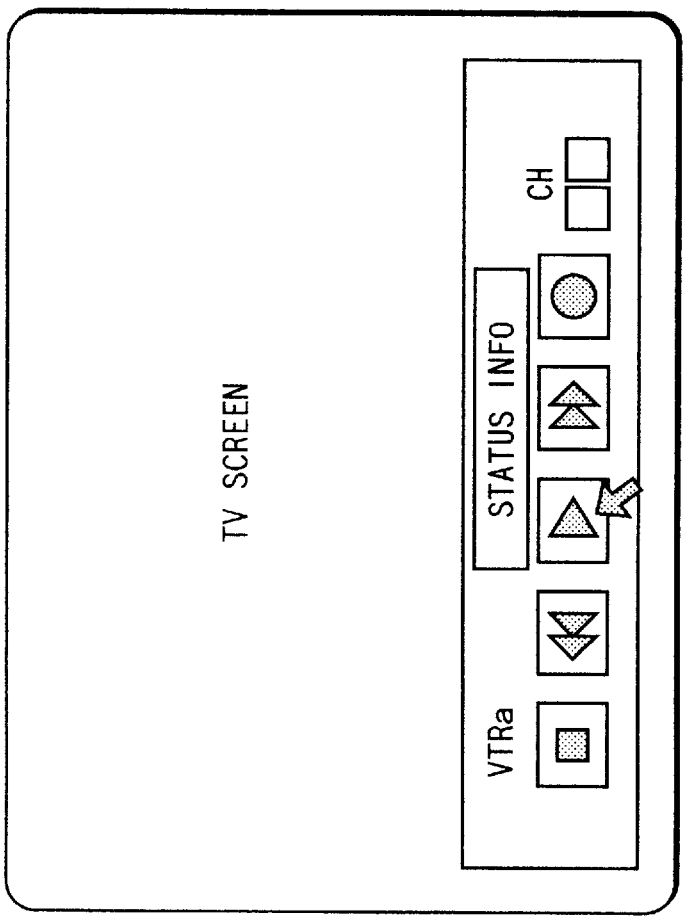
FIG. 6B is an illustration of this embodiment showing an operation input interface image for a reproduction operation.
Figure 6A:
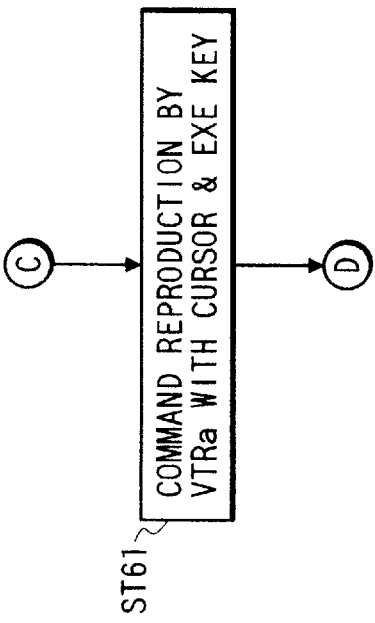
FIG. 6A depicts a flow chart of this embodiment showing a command operation of reproduction.

FIG. 6A depicts a flow chart of this embodiment showing a command operation of the reproduction. FIG. 6B is an illustration of this embodiment showing the operation input interface image for the reproduction operation.

When the operator selects the reproduction mode as shown in FIG. 6B by operating the cursor key 52 and depressing the execution key 53 in the condition that the operation input interface image of the video tape recorder 2 is displayed, the reproduction command is received by the remote control program (VTRa-RCP) 42' in the RAM 18 via the local control program (TV-LCP) 20 and transmitted to the video tape recorder 2 through the communication cable 4 and the communication interfaces 15 and 36 of which link conditions are kept by the communication programs 21 and 44.

The central processing unit (VTRa-CPU) 37 of the video tape recorder 2 receiving the reproduction command by the communication interface 36 and the communication program 44 executes the local control program (VTRa-LCP) 41 to move its operation mode to the reproduction mode by controlling the video tape hard ware portion 31. Then, the central processing unit 37 of the video tape recorder 2 transmits the video signal derived from the reproduction of a video tape to the television set 1 through the communication interface 36 and the communication cable 4 and the television set 1 receives the reproduced video signal and displays the reproduced video image on the display 12. Moreover, the video tape recorder 2 generates and transmits status information indicative of an operation status of the video tape recorder 2 to the television set 1 through the communication cable 4. The central processing unit 16 of the television set 1 receives the status information using the local control program 20 of the television set 1 and executes the remote control program (VTRa-RCP) 42' in the RAM 18, thereby displaying the status information at a predetermined area at the operation input interface image on the display 12.

Figure 7B:
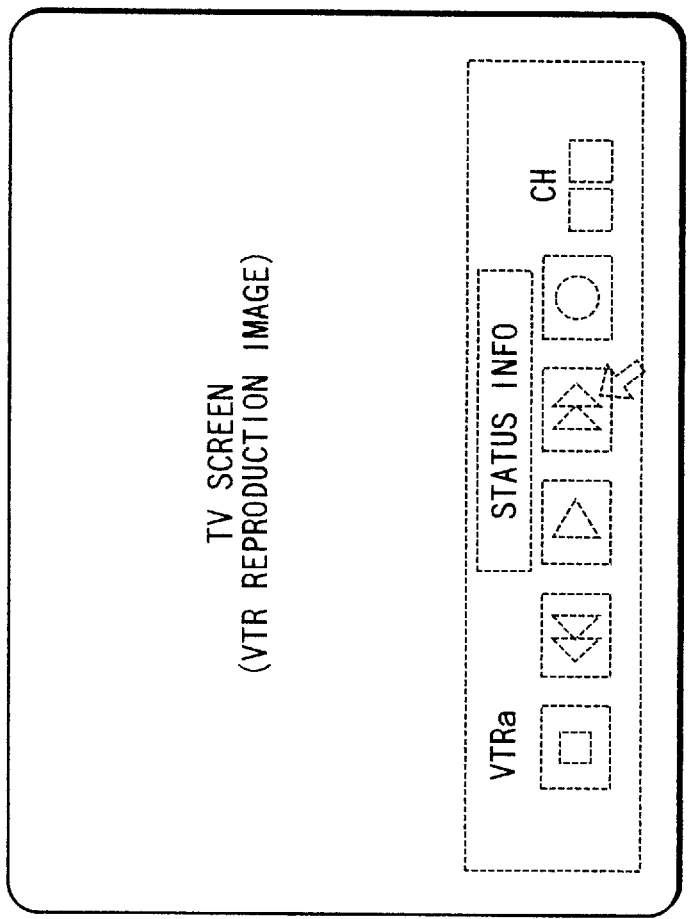
FIG. 7B is an illustration of this embodiment showing an operation input interface image with a reproduction image.
Figure 7A:
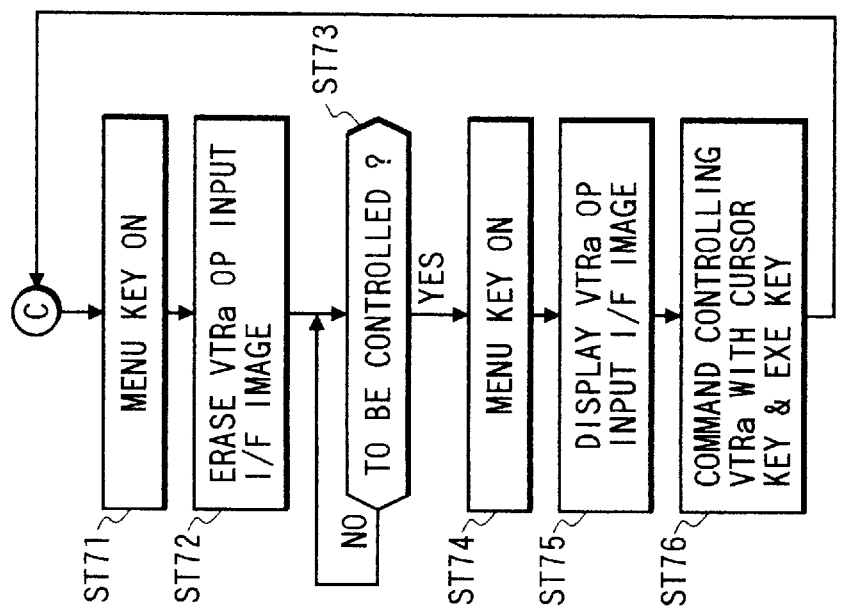
FIG. 7A depicts a flow chart of this embodiment showing a remote control operation of the video tape recorder by the television set.

FIG. 7A depicts a flow chart of this embodiment showing a remote control operation of the video tape recorder by the television set 1. FIG. 7B is an illustration of this embodiment showing the operation input interface image with the reproduction image from the video tape recorder 2.

During the reproduction mode, this link condition between the television set 1 and the video tape recorder 2 is kept, so that a further controlling the video tape recorder 2 during reproduction can be received by the television set 1 and the video tape recorder 2. That is, as shown, the operator can display the operation input interface image by operating the menu key 51 on the remote control unit 5 as necessary in step st71 and can other desired controlling is provided by operating the keys on the remote control unit 5 through the operation input interface image in step st76. Moreover, the operation input interface image can be erased from the screen of the display 12.

In the above-mentioned description, it is important that the remote control program (VTRa-RCP) 42' is originally stored in the video tape recorder (VTRa) 2 and the actual controlling is effected by the coactive operation by the remote control program (VTRa-RCP) 42' in the RAM 18 of the television set 1 transmitted from the video tape recorder and the local control program (VTRa-LCP) 41 in the ROM 38 of the video tape recorder 2 through the communication line 4 using the virtual language processing program. Thus, the actual command to the hardware portion 31 of the video tape recorder 2, such as reproduction and recording, can be independently defined within the video tape recorder 2, that is, it is unnecessary to uniquely define command codes with command codes managed among respective remote control electronic apparatus coupled to the network.

Figure 8:
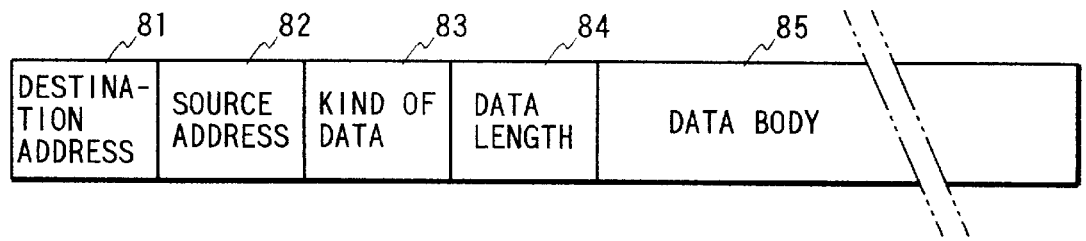
FIG. 8 is an illustration of this embodiment showing a format of data.

FIG. 8 is an illustration of this embodiment showing a format of data transmitted.

The data transmitted between remote control electronic apparatus in the network has the format as shown in FIG. 8, that is, the data includes data of a destination address 81, a source address 82, a kind of data 83, a data length 84, and data body 85 to be communicated. The data of the destination address and the source address 82 are managed and generated by the interfaces 15, 36, etc. and the communication programs and indicate the source of the remote control electronic apparatus transmitting the data body 85 and the destination remote control electronic apparatus which should receive the transmitted data body 85. The kind of data is a flag indicating either of the remote control data, the device data, or the other data.

In the remote controlling between the remote control electronic apparatus, the communication interface of the remote control electronic apparatus receiving the transmitted data acquires the transmitted data and stores it and the data of the source of the remote control electronic apparatus transmitting the data if the data of destination address 81 is directed to the remote control electronic apparatus. Then, if the kind of data is a remote control program of the source remote control electronic apparatus, the central processing unit stores the data as the remote control program of the source remote control electronic apparatus In the RAM. Then, the remote controlling between the remote control electronic apparatus mentioned above is effected through translating the remote control program with the virtual language translating processing program. If the kind of data is not the remote control program (RCP), that is, if the kind of data is a control command, the data is forwarded to the local control program to executes the control command and if the kind of dat is status information, it is forwarded to the remote control program to display the operation input interface image as shown in FIG. 5B.

If the transmitted data is the device data of all remote control electronic apparatus coupled to the communication cable 4, the central processing unit stores the device data in the RAM. The RAM may be provided with a battery backup or comprises an EEPROM (electrically erasable/ programmable read-only memory).

An operation of controlling the television set 1 on the side of the video tape recorder 2 will be described.

Figure 9:
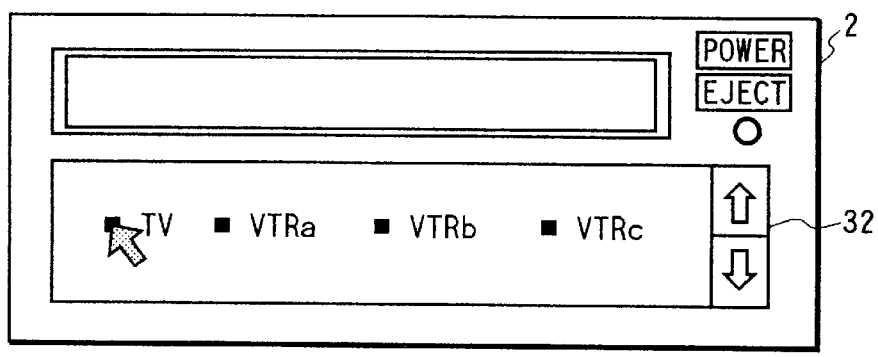
FIGS. 9 and 10 are front views of the video tape recorder of this embodiment.
Figure 10:
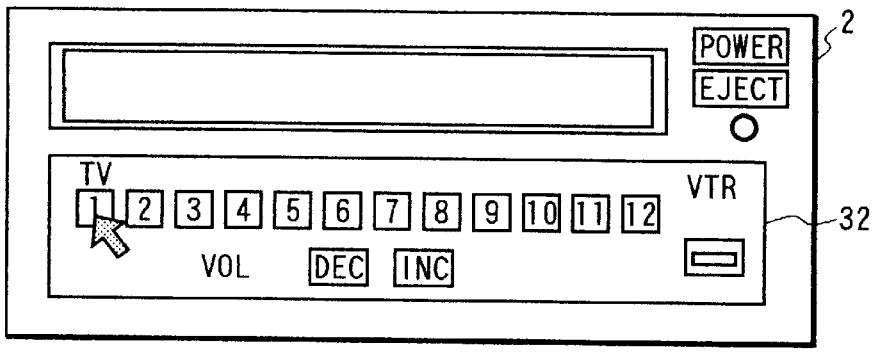

FIGS. 9 and 10 are front views of the video tape recorder of this embodiment.

When the operator depresses the device selection key 54 with the light emitting portion 55 of the remote control unit 5 directed to the video tape recorder 2, the video tape recorder 2 displays a table of devices to be controlled on the LCD 32 in accordance with the device data 70 as shown in FIG. 9. The operator operates the cursor key 52 to move the cursor to a marker of the television set 1 in the table and depresses the execution key 53 of the remote control unit 5.

In response to this, the central processing unit 37 of the video tape recorder 2 generates a control request command of the television set 1 in accordance with the device data 70 under the control of the local control program (VTRa-LCP) 41 and controls the communication interface 36 by executing the communication program 44 to transmit the control request command to the television set 1 through the communication cable 4.

Figure 11:
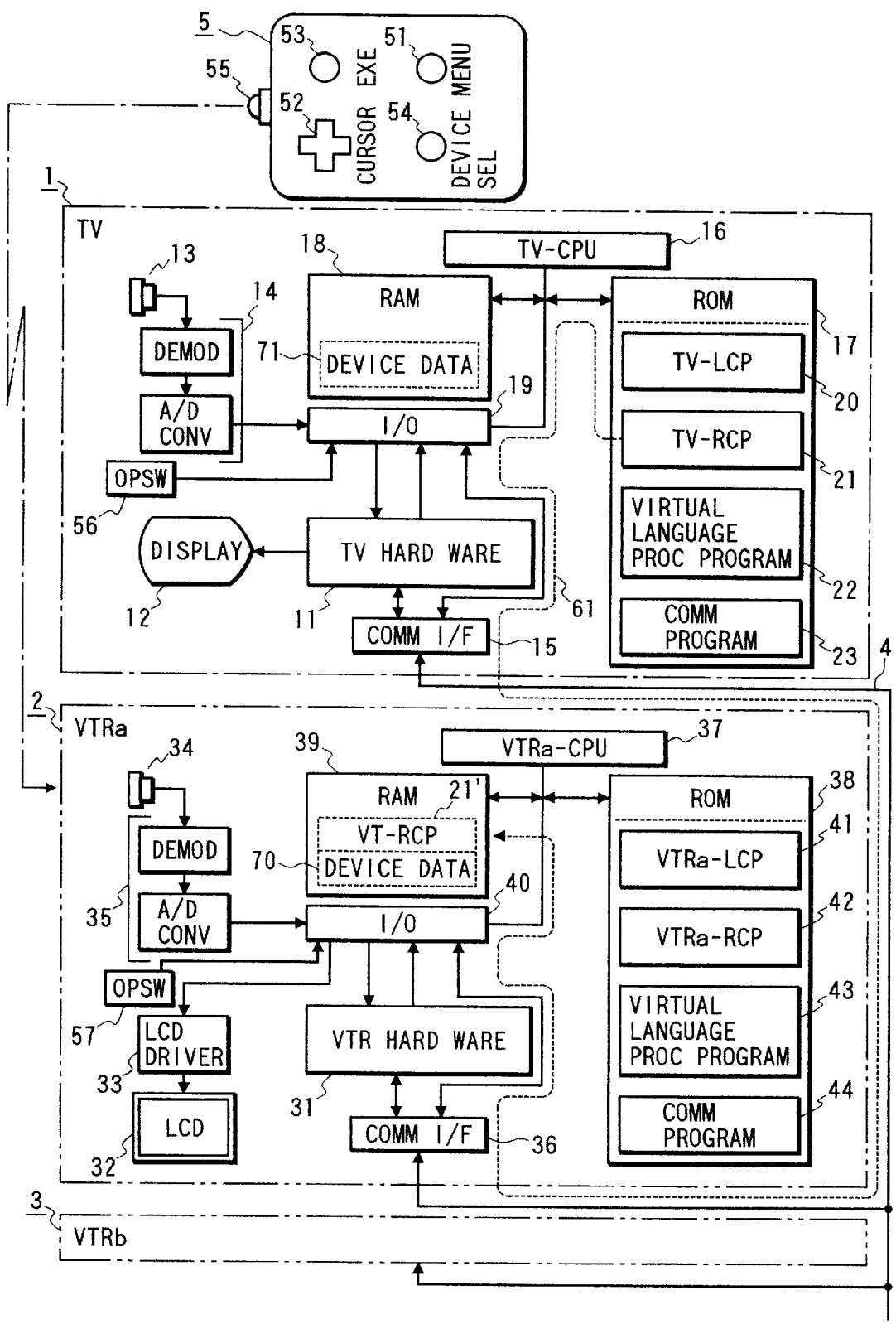
FIG. 11 is a block diagram of this embodiment in a remote control condition for controlling the television set from the video tape recorder.

FIG. 11 is a block diagram of this embodiment in a remote control condition for controlling the television set from the video tape recorder 2.

The central processing unit 16 of the television set 1 receiving the control request command, reads the remote control program 21 from the ROM 17, executes the communication program 23, and transmits the read remote control program 21 to the video tape recorder 2 through the communication interface 15 and the communication cable 4 under the control of the local control program 20 as shown by the chain line 61 in FIG. 11.

The central processing unit 37 of the video tape recorder 2 receives the remote control program 21 transmitted from the television set 1 through the communication interface 36 and stores the remote control program 21 as a remote control program 21' in the RAM 39 under the control of the local control program 41.

As mentioned, though the relation between the devices are inverse, the remote control program 21 is stored in the RAM 39 as similar to the remote control program 42 is stored in the RAM 18 in step s51 as mentioned earlier.

Then, the central processing unit 37 executes the remote control program 21' stored in the RAM 39 with commands of the remote control program 21' translated by the virtual language processing program 43 under the control of the local control program 41.

The central processing unit 37 displays the operation input interface image as shown in FIG. 10 under the control of the local control program 41. Then, the central processing unit 37 receives commands from the remote control unit 5.

This operation input interface image shown in FIG. 10 is substantially the same as that shown in FIG. 2B. However, because the size of the LCD 32 is small, it is necessary to change the arrangement of the icons to display all necessary icons. Actually, each of the remote control programs 21, 21', 42, and 42' stores a plurality sets of data of the operation input interface images having different arrangements. The local control program 41 selects and displays one of operation input interface images suitable for the LCD 32.

The operation input interface image of the video tape recorder 2 includes icons regarding operations of the television set 1, and an icon for controlling the video tape recorder 2 itself. Then, as similar to the case of remote-controlling the video tape recorder 2 by the television set 1, the remote-controlling the television set 1 is performed through the coactive operation between the local control program (VTRa-LCP) 41 and remote control program (TV-RCP) 21'.

Therefore, in this operation, it is also unnecessary to uniquely define command codes with command codes managed among respective remote control electronic apparatus coupled to the network.

If a plurality of television sets are coupled to the communication cable 4 and the communication cable can only transmits one channel of video signal, only one television set is allowed to control a video tape recorder. Other television sets are inhibited to control the video tape recorder by transmitting a control inhibit command from the video tape recorder in response to a further control request command and only allowed to monitor the same reproduced image.

As mentioned, because the remote control operation between two remote control electronic apparatus is provided by the remote control program expressed by a virtual language which is common in the network and is executed by the virtual language processing program with the remote control program is transmitted to the remote control electronic apparatus remote-controlling the other remote control electronic apparatus, the command codes for controlling the hardware portion of each remote control electronic apparatus can be independently defined and it is easy to add a new remote control electronic apparatus to the network.

A modification will be described.

As mentioned above, when the system is started up, the operator inputs address data and data of kinds of remote control electronic apparatus coupled to the communication cable 4 to the television set 1 through the remote control program 20 and the remote control program 21 using the remote control unit 5. The central processing unit 16 stores the address data and data of kinds of remote control electronic apparatus, as device data 71, in the RAM 18 through the remote control program 20 and the remote control program 21 using the remote control unit 5 and transmits the device data to other electronic apparatus. However, in the modification, when the central processing unit 16 receives the command of the device selection key 54 in step st42, the central processing unit 16 generates a global device data request command directing to all other electronic apparatus coupled to the communication cable 4. Each of the central processing units of other electronic apparatus receiving the global device data request command generates its device data stored in its local control program and returns its device data to the central processing unit 16 under control of its local control program. The central processing unit 16 receiving device data from other electronic apparatus generates the device table 59 as shown in FIG. 4B. Other structure and operation are similar as mentioned earlier.

What is claimed is:

1. A method of controlling a plurality of electronic apparatus coupled to a network, each electronic apparatus having a microprocessor, a display, at least a memory, a remote control unit communication unit, and a functional unit effecting a plurality of functions, comprising the steps of:

providing a local control program, a remote control program, and a virtual language processing program in said at least a memory of each electronic apparatus, said local control program of each electronic apparatus being provided to be executed by said microprocessor to control each electronic apparatus in response to an input operation signal from a remote control unit in cooperation with said remote control program through said remote control unit communication unit when said input operation signal is indicative of controlling said functional unit of said each electronic apparatus itself and to request another electronic apparatus to transmit said remote control program of said another electric apparatus through said network and receive said remote control program of said another electronic apparatus when said input operation signal is indicative of controlling said functional unit of said another electronic apparatus, said each local control program being expressed by each language interpretable by said microprocessor of each electronic apparatus, said remote control program of each electronic apparatus being provided to display an operation inputting interface image for selecting one of said plurality of functions of said each electronic apparatus in cooperation with said local control program of said each electronic apparatus, receive said input operation signal indicative of selecting said one of said plurality of functions from said remote control unit, and control said functional unit of said each electronic apparatus together with said local control program of said each electronic apparatus in accordance with said input operation signal indicative of selecting said one of functions, said remote control program including command and data which are expressed by a virtual language and being executed by said microprocessor through processing by said virtual language processing program, said virtual language being common in said network; and when said microprocessor of one of said electronic apparatus receives said input operation signal indicative of a request for controlling said another electronic apparatus from said remote control unit, executing said local control program of said one of electronic apparatus to request said another electronic apparatus to transmit said remote control program of said another electronic apparatus, receiving and storing said remote control program of said another electronic apparatus in said at least a memory and executing said remote control program from said another electronic apparatus in said memory, displaying said operation inputting interface image on said display of said one of said electric apparatus, receiving and transmitting said input operation signal indicative of selecting said one of functions of said another electronic apparatus from said remote control unit to said local control program of said another electronic apparatus through said network to effect one of said functions of said another electronic apparatus.

2. An electronic apparatus to be coupled to another electronic apparatus through a network, comprising:

a microprocessor, a display, a RAM, a ROM, a remote control unit communication unit, a network interface unit, and a functional unit for effecting a plurality of functions, wherein said ROM stores a local control program independently interpretable for said microprocessor, a remote control program including operation input interface image data for selecting one of said plurality of functions, and a virtual language processing program for interpreting said remote control program for said microprocessor, said microprocessor receives an input operation signal from a remote control unit via said remote control unit communication unit in cooperation with said local control program and said remote control program, when said microprocessor receives said input operation signal indicative of a request for controlling another electronic apparatus from said remote control unit, in cooperation with said local control program of said electronic apparatus, said microprocessor requests said another electronic apparatus to transmit said remote control program of said another electronic apparatus through said network, receives and stores said remote control program of said another electronic apparatus in said RAM, said microprocessor executes said remote control program from said another electronic apparatus in said RAM using said virtual language processing program, displays said operation inputting interface image data of said another electronic apparatus on said display, and receives and transmits said input operation signal indicative of selecting said one of plurality of functions of said another electronic apparatus from said remote control unit to said another electronic apparatus through said network and said network interface unit to effect one of said functions of said another electronic apparatus through said local control program in said another electronic apparatus.

* * * * *